(12) United States Patent
Baughman et al.

(10) Patent No.: US 9,174,312 B2
(45) Date of Patent: Nov. 3, 2015

(54) METHODS FOR THE REPAIR OF GAS TURBINE ENGINE COMPONENTS USING ADDITIVE MANUFACTURING TECHNIQUES

(71) Applicant: HONEYWELL INTERNATIONAL INC., Morristown, NJ (US)

(72) Inventors: Brian G. Baughman, Surprise, AZ (US); Gary Winchester, Simpsonville, SC (US); William F. Hehmann, Spartanburg, SC (US); Donald G. Godfrey, Phoenix, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 273 days.

(21) Appl. No.: 13/797,382

(22) Filed: Mar. 12, 2013

(65) Prior Publication Data

US 2014/0259666 A1 Sep. 18, 2014

(51) Int. Cl.
*B23P 6/00* (2006.01)
*B22F 3/105* (2006.01)
*B22F 7/06* (2006.01)
(Continued)

(52) U.S. Cl.
CPC ............... *B23P 6/002* (2013.01); *B22F 3/1055* (2013.01); *B22F 7/062* (2013.01); *B23K 1/0018* (2013.01); *B23P 6/005* (2013.01); *F01D 5/005* (2013.01); *B22F 5/04* (2013.01); *B22F 2007/068* (2013.01);
(Continued)

(58) Field of Classification Search
CPC ...... B33Y 10/00; B33Y 80/00; B22F 3/1055; B22F 3/1057; B22F 3/1058; B23P 6/002; B23P 6/005; B23P 6/007; F01D 5/005; Y10T 29/49737; Y10T 29/49742; Y10T 29/4973; Y10T 29/49721; Y10T 29/49723; Y10T 29/49725; Y10T 29/49726; Y10T 29/49728; Y10T 29/49318; Y10T 29/49895; B23K 15/0086; B23K 26/34; B23K 26/345; B23K 2201/001

See application file for complete search history.

(56) References Cited

U.S. PATENT DOCUMENTS 5,269,057 A   12/1993   Mendham
6,568,077 B1 *  5/2003   Hellemann et al. .......... 29/889.1
(Continued)

FOREIGN PATENT DOCUMENTS

EP   0504095 A2   9/1992
EP   2317075 A3   8/2011
(Continued)

OTHER PUBLICATIONS

EP Search Report for Application No. 14157733.8, Dated Jun. 13, 2014.
(Continued)

*Primary Examiner* — Jason L Vaughan
(74) *Attorney, Agent, or Firm* — Ingrassia Fisher & Lorenz, P.C.

(57) ABSTRACT

In accordance with an exemplary embodiment, a method for repairing a damaged metallic component using additive manufacturing techniques includes separating a damaged portion of the damaged metallic component from an undamaged portion of the damaged metallic component, measuring the undamaged portion to determine the dimensions of the removed damaged portion, fabricating a replacement portion using additive manufacturing techniques in accordance with the determined dimensions of the removed damaged portion, and joining the replacement portion with the undamaged portion of the damaged metallic component to form a repaired metallic component.

20 Claims, 4 Drawing Sheets

(51) Int. Cl.
  *F01D 5/00* (2006.01)
  *B23K 1/00* (2006.01)
  *B22F 5/04* (2006.01)

(52) U.S. Cl.
  CPC ........ *B23K 2201/001* (2013.01); *Y10T 29/4973* (2015.01); *Y10T 29/49318* (2015.01)

(56) References Cited

U.S. PATENT DOCUMENTS

| | | | |
|---|---|---|---|
| 7,433,799 B2 * | 10/2008 | Lin et al. | 702/167 |
| 7,797,828 B2 | 9/2010 | Beeson et al. | |
| 7,810,237 B2 | 10/2010 | Lange et al. | |
| 7,841,834 B1 * | 11/2010 | Ryznic | 416/224 |
| 2009/0255102 A1 | 10/2009 | McMasters et al. | |
| 2011/0099810 A1 | 5/2011 | Stankowski et al. | |
| 2011/0311389 A1 | 12/2011 | Ryan et al. | |
| 2012/0198676 A1 | 8/2012 | Rickenbacher et al. | |

FOREIGN PATENT DOCUMENTS

| | | |
|---|---|---|
| EP | 2317076 A3 | 8/2011 |
| EP | 2361720 A1 | 8/2011 |
| EP | 2484481 A1 | 8/2012 |
| WO | 2004096487 A1 | 11/2004 |

OTHER PUBLICATIONS

EP Examination Report for Application No. 14157733.8, Dated Jun. 24, 2014.

* cited by examiner

METHODS FOR THE REPAIR OF GAS TURBINE ENGINE COMPONENTS USING ADDITIVE MANUFACTURING TECHNIQUES

TECHNICAL FIELD

An embodiment of the present disclosure generally relates to gas turbine engines, and more particularly relates to improved methods of repairing components for use in gas turbine engines.

BACKGROUND

A gas turbine engine may be used to power aircraft or various other types of vehicles and systems. The engine typically includes a compressor that receives and compresses an incoming gas such as air; a combustion chamber in which the compressed gas is mixed with fuel and burned to produce exhaust gas; and one or more turbines that extract energy from the high-pressure, high-velocity exhaust gas exiting the combustion chamber.

Recently, additive manufacturing (AM) methods have emerged, including for example the use of direct metal laser sintering/fusion (DMLS)/(DMLF), selective laser sintering (SLS), and electron beam melting (EBM), to eliminate the need for tooling, which is expected to result in significant cost and cycle time reduction in the manufacture of gas turbine engines. EBM uses an electron beam and DMLF uses a laser to solidify a metal powder. Parts are built in small layers (a few mils) in additive steps to produce a completed part. Fine powdered alloys are sintered and melted into a final part. The mechanics of the DMLF and EBM build processes are very similar, except for the fact that the DMLF process uses a laser and the EBM process utilizes an electron beam. Both energy sources melt fine layers of powder and fuse that layer to the subsequent layer below directly below it.

Additive processes such as DMLS, SLS, and EBM offer the ability to manufacture complex geometries on a small scale from CAD-based models. These processes have the ability to create components made of various aerospace alloys, including titanium, cobalt, nickel-based superalloys. In addition to manufacturing aerospace components as noted above, this ability can also be utilized to repair parts with complex geometries where no other conventional process is successful. Static components such as turbine nozzles and vane segments, as well as heat exchangers and fuel control manifolds, all have complex geometries that can benefit from such a repair process.

In many cases, however, it is not possible to fit the entire component (which may have been originally cast or fabricated through non-AM means) into the working range of the AM equipment. Also, considering that certain materials made with AM require special post-processing operations such as hot isostatic pressing (HIP) and coating, it may not be possible or desired to subject the entire component to these operations during repair.

Accordingly, it is desirable to provide improved methods for repairing components for use in gas turbine engines. Further, it is desirable to provide methods that allow gas turbine engine components, regardless of size or post-processing operations, to be repaired using additive manufacturing techniques. Furthermore, other desirable features and characteristics of the invention will become apparent from the subsequent detailed description and the appended claims, taken in conjunction with the accompanying drawings and this background of the invention.

BRIEF SUMMARY

In accordance with an exemplary embodiment, a method for repairing a damaged metallic component using additive manufacturing techniques includes separating a damaged portion of the damaged metallic component from an undamaged portion of the damaged metallic component, measuring the undamaged portion to determine the dimensions of the removed damaged portion, fabricating a replacement portion using additive manufacturing techniques in accordance with the determined dimensions of the removed damaged portion, and joining the replacement portion with the undamaged portion of the damaged metallic component to form a repaired metallic component.

In accordance with another exemplary embodiment, a method for repairing a damaged gas turbine engine component using additive manufacturing techniques includes evaluating a damaged gas turbine engine component to determine an extent of damage to the gas turbine engine component, separating a damaged portion of the gas turbine engine component from an undamaged portion of the damaged gas turbine engine component, and measuring the undamaged portion to determine the dimensions of the removed damaged portion. The method further includes fabricating a replacement portion using additive manufacturing techniques in accordance with the determined dimensions of the removed damaged portion, subjecting the replacement portion to a post-processing operation, and joining the replacement portion with the undamaged portion of the damaged gas turbine engine component to form a repaired gas turbine engine component.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third components, simply denote different singles of a plurality unless specifically defined by language in the appended claims. All of the embodiments and implementations of the gas turbine engine components and methods for the manufacture thereof described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Further, although certain embodiments described herein provide improved methods for repairing gas turbine engine components, including static or rotating components, such as a turbine nozzle, a turbine vane segment, a heat exchanger, or a fuel control manifold, it will be appreciated that the methods described herein will be useful in any number of applications wherein additive manufacturing techniques are employed or may be useful. In particular, the methods described herein may find application in any of various implementations (including those outside of gas turbine engine, or outside of the field of aerospace components in general) where it is desirable to repair a metallic component using additive manufacturing techniques.

Whereas prior art methods have addressed bonding sections of new components to repair older ones, embodiments of the present disclosure differ in their ability to create the damaged section via AM and not rely on a new part being sacrificed. That is, it is not necessary to obtain a new part, and cut a portion of the new part for use in the repair (thereby likely damaging the new part such that it would not longer be useable). The disclosed embodiments also differ in their ability to tailor dimensions of the damaged section to fit the exact geometry of the part. For example, field use can subject a part to various conditions that can move or distort its original dimensions. As is known in the art, even brand new parts that have wide tolerances can vary from part-to-part in their exact dimensions. It is advantageous to have the ability to tailor the pre-fabricated structure to the necessary dimensions for precise alignment and provide a part that meets design intent and airworthiness standards.

Figure 1:
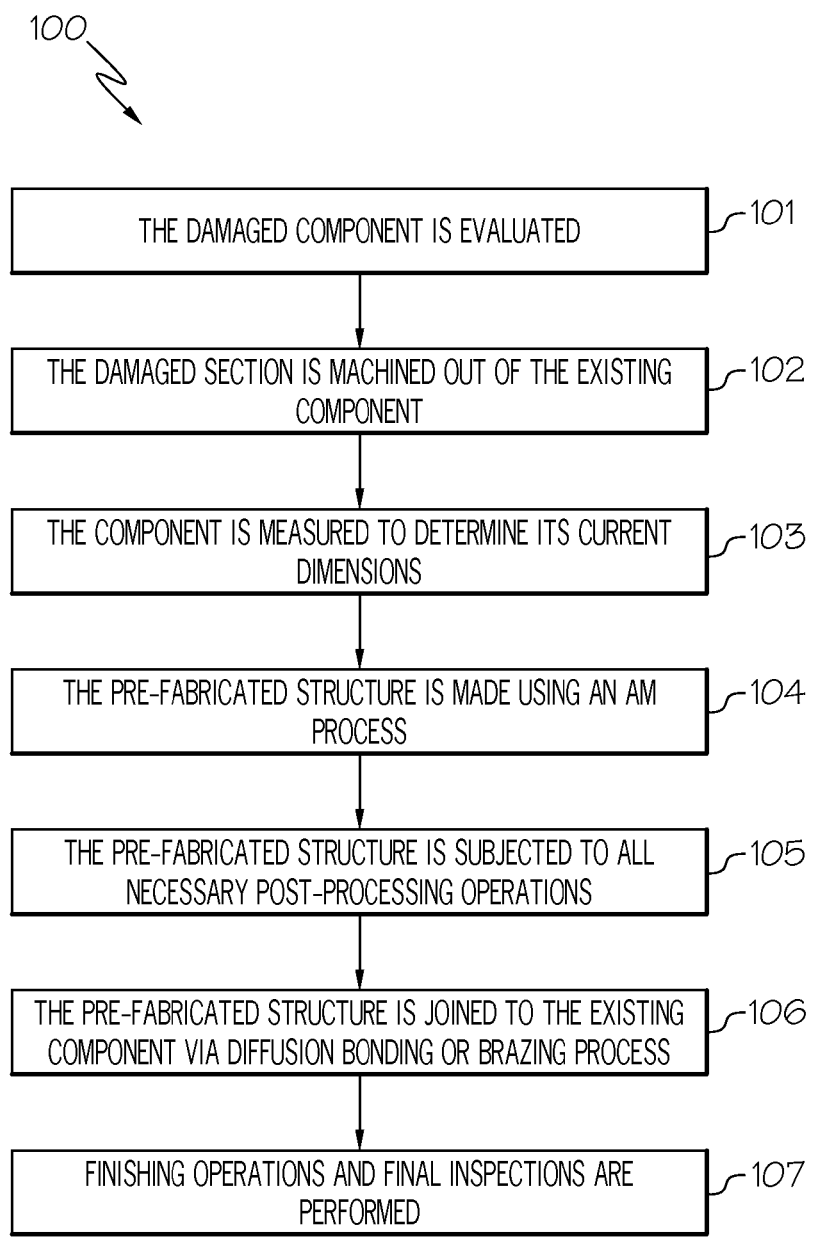
FIG. 1 is a flowchart showing method steps in a method for repairing a gas turbine engine component using additive manufacturing techniques.
Figure 2:
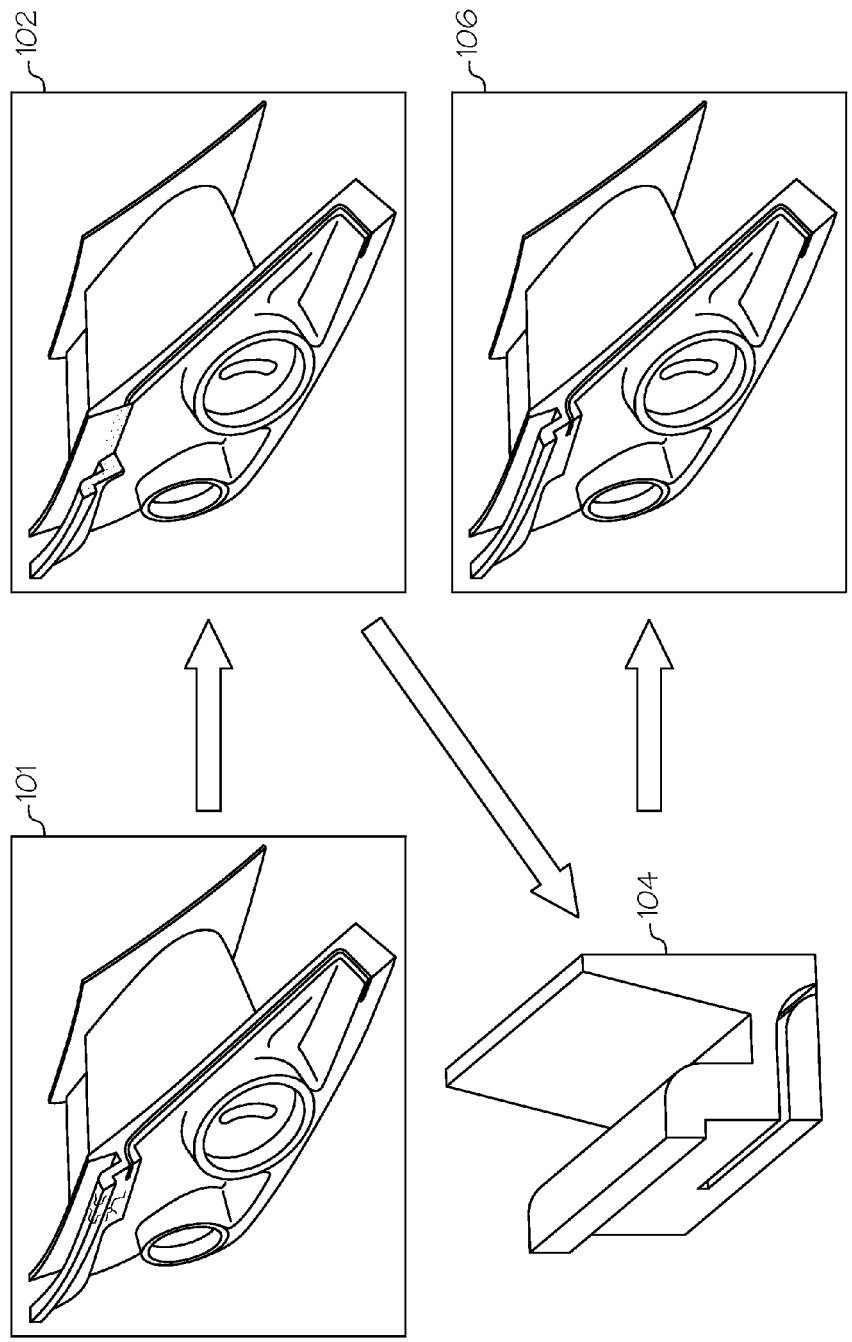
FIG. 2 is a flow diagram illustrating certain steps in the method of FIG. 1 for repairing a gas turbine engine component using additive manufacturing techniques

Reference is now made to FIGS. 1 and 2, which depict an exemplary method 100 for repairing damaged gas turbine engine components using additive manufacturing techniques. The method assumes that at least one damaged turbine engine component is made available for repair. As will be appreciated by those having ordinary skill in the art, turbine engine components, over time, may be damaged in the course of ordinary operation. The damage may be discovered via routing inspection procedures. After which, the damaged component may be removed from the gas turbine engine and provided for repair in accordance with the present disclosure.

At step 101 of method 100, the damaged component is first evaluated. The damaged area is assessed and it is determined how extensive is the damage. Many methods are known in the art for assessing the damage of a gas turbine engine component, including for example visual inspection and/or non-destructive evaluation (NDE) methods. The present disclosure is not intended to be limiting to any particular method of damage inspection. Damage can cover many types, such as cracks, voids, pitting, as well as dimensional issues (caused by erosion/corrosion, abrasion/wear, impact/FOD (flying object damage)). The damaged component is inspected for all of these issues during engine tear down in requirement with overhaul manuals and to ensure the component meets the design requirements as the original, new part.

At step 102 of method 100, the damaged section is machined out of the existing component. Many methods are known in the art for removing the damaged component, including for example Electro-Discharge Machining (EDM), electro-chemical machining, milling, and laser cutting. The present disclosure is not intended to be limiting to any particular method of damaged component removal inspection.

At step 103 of method 100, the machined-out portion (with the damaged portion thereof having been removed) is then measured to determine its current dimensions so that a pre-fabricated structure can be made to align with the part. Many methods are known in the art for measuring the machined-out portion, including for example a coordinate measuring machine (CMM) or white light measuring. The present disclosure is not intended to be limiting to any particular method of measuring. A CAD model can then be generated based on these measurements. In one embodiment, the measurement can be performed in accordance with the procedures set forth in commonly-assigned U.S. Pat. No. 7,797,828, the subject matter of which is incorporated by reference herein in its entirety.

At step 104 of method 100, the pre-fabricated structure for replacing the removed damaged portion of the component is made using an additive manufacturing process utilizing the inspection data. To fabricate the replacement portion for the damaged portion of the component, embodiments of the present disclosure utilize a manufacturing process that incorporates a low energy density laser beam, referred to as "direct metal laser fusion" (DMLF), or a low energy electron beam, referred to as "electron beam melting" (EBM), in a powder tank. These "free-form" or "additive manufacturing" (AM) processes use a small, focused beam to build a component by fusing or melting one layer of powder to the fused or melted layer of powder directly beneath it. The additive manufacturing methods disclosed herein utilize DMLF/EBM to build unique designs that are not practical and/or possible with prior technologies, where costly and time-consuming tooling is required.

In general, it is expected that, based on the teachings herein, a person having ordinary skill in the art will be able to design a replacement portion for a damaged component part, such as for use in a gas turbine engine, to conform for use in a wide variety of applications, as the selection of size, shape, etc. of working components is generally considered to be within the level of skill of a person having ordinary skill in the art. As such, the various possible implementations and uses of the improved methods described herein should not be considered limited to any of the embodiments presented herein.

Greater detail regarding the additive manufacturing techniques noted above will now be provided, again with reference to the exemplary gas turbine engine components. Suitable additive manufacturing techniques include, for example, direct metal laser sintering (DMLS—a form of direct metal laser fusion (DMLF)) with nickel base super-alloys, low density titanium, and aluminum alloys. DMLS is discussed in greater detail below. Another technique includes electron beam melting (EBM) with titanium, titanium aluminide, and nickel base super-alloy materials.

Figure 3:
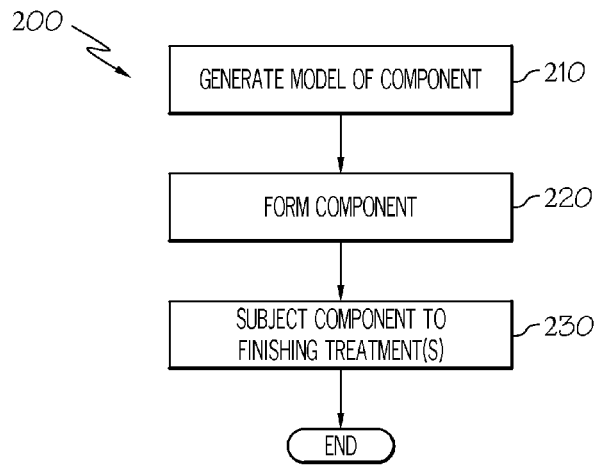
FIG. 3 is a flow diagram illustrating steps in a method of manufacturing a portion of a gas turbine engine component using additive manufacturing techniques for use in repairing a damaged gas turbine engine component.

FIG. 3 is a flowchart illustrating a method 200 for manufacturing a replacement portion of a gas turbine engine component in accordance with an exemplary embodiment using, in whole or in part, additive manufacturing techniques. As such, method 200 is useful to perform step 104 of method 100. In a first step 210, a model, such as a design model, of the portion of the gas turbine engine component may be defined in any suitable manner. For example, the model may be designed with computer aided design (CAD) software and may include three-dimensional ("3D") numeric coordinates of the entire configuration of the gas turbine engine component including both external and internal surfaces. In one exemplary embodiment, the model may include a number of successive two-dimensional ("2D") cross-sectional slices that together form the 3D component.

This design phase step 210 is performed in the following manner. During the design phase, 3D structural analyses are employed to generate an optimal design for a particular implementation, for example the cross-sectional area(s) and the material(s) used in the manufacture of the replacement portion of the gas turbine engine component for optimal life. The configuration is then analyzed with 3D stress/deflection analyses to optimize the mechanical fatigue life of the component. The resulting configuration is enabled without the prior art requirements of brazing/welding. The replacement portion is fabricated as a single, integral unit.

Figure 6:
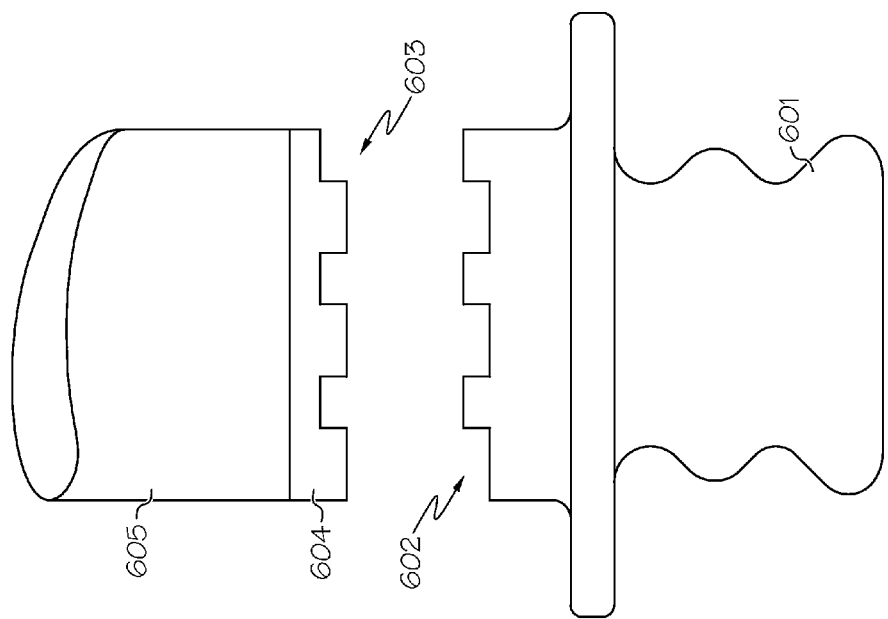
FIGS. 5 and 6 illustrate exemplary embodiments of various locking features in accordance with the present disclosure.
Figure 5:
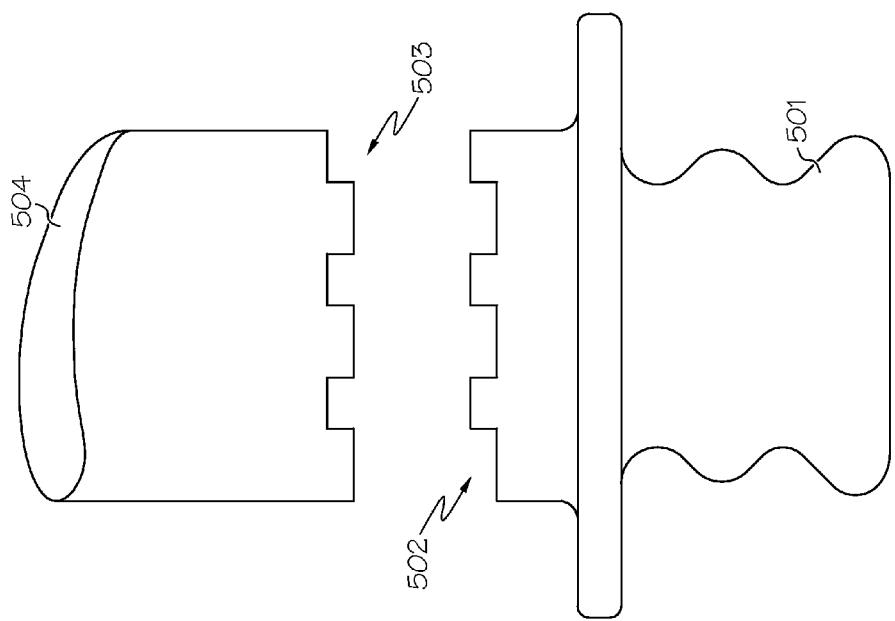

In some embodiments, the design phase step 210 may be performed so as to include one or more "locking" features into the design of the replacement portion. As used herein, the term locking feature refers to a design feature on the replacement portion that is added to allow the replacement portion to be more easily joined with the damaged component. It is also useful in reducing the necessity for complex fixturing to hold the damaged component in place during the joining operation. In one embodiment, a locking feature may include flanges disposed along peripheral edges of the replacement portion. Such peripheral flanges may enable the replacement portion to be more easily secured into the damaged component, and further may enable the replacement portion to remain immobile during the brazing or welding operations that may be employed to secure the replacement portion in place. Such peripheral flanges would align with corresponding peripheral flanges 502 machined onto the exterior surface of the damaged component 501 immediately adjacent to the machined-out portion. In another embodiment, as shown in FIG. 5, a locking feature may include protrusions and recesses 503 along the edges of the replacement portion 504. These protrusions and recesses will be fitted into protrusions and recesses 502 that are machined onto the edges of the damaged component 501. The two components can be then fit together either by press-fitting, sliding fit (lateral or perpendicular insertion), or any other similar mechanism that enables holding both components together during the joining operation. The pattern, size, and shape of such a locking mechanism can be variable depending on part size, shape, material, joining process, and other manufacturing and product parameters. In another embodiment, shown in FIG. 6, the locking features (602, 603) are made utilizing a joining material 604, such as braze metal or specific weld metal, to make such features onto the end of the replacement piece 605 by AMM means. The joining material can be different from the bulk material of the damaged component 601 and replacement piece 605. The replacement piece 605 can thus be manufactured in bulk (having the same shape and size), with the joining material 604, made using the methods described herein, serving as the link between the two. This will serve the purpose of precisely locating the joining material where it best serves purpose for design requirements and also easing manufacturing issues with filler material placement.

In step 220 of the method 200, the replacement portion of the gas turbine engine component is formed according to the model of step 210. In one exemplary embodiment, the replacement portion of the gas turbine engine component is formed using a rapid prototyping or additive layer manufacturing process. Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the replacement portion of the gas turbine engine component in step 220. DMLF is a commercially available laser-based rapid prototyping and tooling process by which complex parts may be directly produced by precision melting and solidification of metal powder into successive layers of larger structures, each layer corresponding to a cross-sectional layer of the 3D component.

As such, in one exemplary embodiment, step 220 is performed with DMLF techniques to form the replacement portion of the gas turbine engine component. However, prior to a discussion of the subsequent method steps, reference is made to FIG. 4, which is a schematic view of a DMLF system 300 for manufacturing the replacement portion of the gas turbine engine component.

Figure 4:
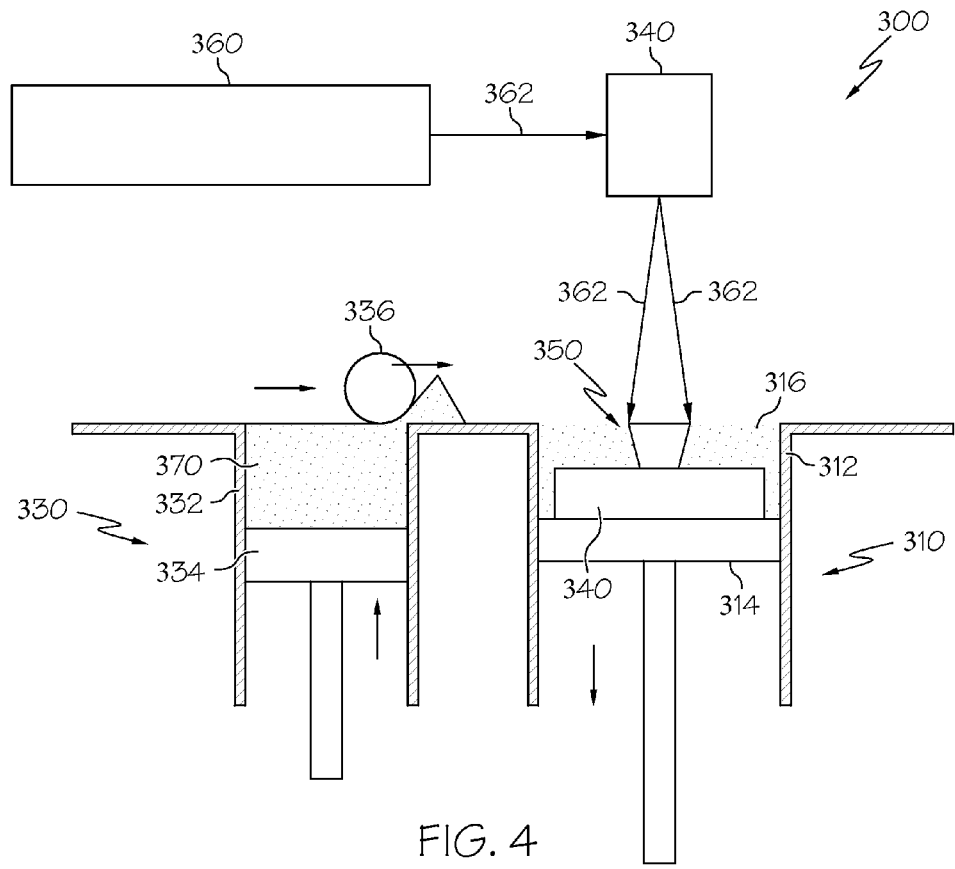
FIG. 4 is an exemplary additive manufacturing system suitable for use in manufacturing a portion of a gas turbine engine using additive manufacturing techniques.

Referring to FIG. 4, the system 300 includes a fabrication device 310, a powder delivery device 330, a scanner 340, and a laser 360 that function to manufacture the article 350 (e.g., the gas turbine engine component) with build material 370. The fabrication device 310 includes a build container 312 with a fabrication support 314 on which the article 350 is formed and supported. The fabrication support 314 is movable within the build container 312 in a vertical direction and is adjusted in such a way to define a working plane 316. The delivery device 330 includes a powder chamber 332 with a delivery support 334 that supports the build material 370 and is also movable in the vertical direction. The delivery device 330 further includes a roller or wiper 336 that transfers build material 370 from the delivery device 330 to the fabrication device 310.

During operation, a base block 340 may be installed on the fabrication support 314. The fabrication support 314 is lowered and the delivery support 334 is raised. The roller or wiper 336 scrapes or otherwise pushes a portion of the build material 370 from the delivery device 330 to form the working plane 316 in the fabrication device 310. The laser 360 emits a laser beam 362, which is directed by the scanner 340 onto the build material 370 in the working plane 316 to selectively fuse the build material 370 into a cross-sectional layer of the article 350 according to the design. More specifically, the speed, position, and other operating parameters of the laser beam 362 are controlled to selectively fuse the powder of the build material 370 into larger structures by rapidly melting the powder particles that may melt or diffuse into the solid structure below, and subsequently, cool and re-solidify. As such, based on the control of the laser beam 362, each layer of build material 370 may include unfused and fused build material 370 that respectively corresponds to the cross-sectional passages and walls that form the article 350. In general, the laser beam 362 is relatively low power to selectively fuse the individual layer of build material 370. As an example, the laser beam 362 may have a power of approximately 50 to 500 Watts, although any suitable power may be provided.

Upon completion of a respective layer, the fabrication support 314 is lowered and the delivery support 334 is raised.

Typically, the fabrication support 314, and thus the article 350, does not move in a horizontal plane during this step. The roller or wiper 336 again pushes a portion of the build material 370 from the delivery device 330 to form an additional layer of build material 370 on the working plane 316 of the fabrication device 310. The laser beam 362 is movably supported relative to the article 350 and is again controlled to selectively form another cross-sectional layer. As such, the article 350 is positioned in a bed of build material 370 as the successive layers are formed such that the unfused and fused material supports subsequent layers. This process is continued according to the modeled design as successive cross-sectional layers are formed into the completed desired portion, e.g., the replacement portion of the gas turbine engine component of step 220.

The delivery of build material 370 and movement of the article 350 in the vertical direction are relatively constant and only the movement of the laser beam 362 is selectively controlled to provide a simpler and more precise implementation. The localized fusing of the build material 370 enables more precise placement of fused material to reduce or eliminate the occurrence of over-deposition of material and excessive energy or heat, which may otherwise result in cracking or distortion. The unused and unfused build material 370 may be reused, thereby further reducing scrap.

Any suitable laser and laser parameters may be used, including considerations with respect to power, laser beam spot size, and scanning velocity. As a general matter, the build material 370 may be formed by any suitable powder, including powdered metals, such as a stainless steel powder, and alloys and super alloy materials, such as nickel-based or cobalt superalloys. In one exemplary embodiment, the build material 370 is a high temperature nickel base super alloy such as IN718. In other embodiments, MAR-M-247, IN738, IN625, Hastalloy X, Haynes 188 and 230, MERL72, Coast Metal 64, titanium, aluminum, titanium-aluminide, or other suitable alloys may be employed. In still other embodiment, suitable alloys include cobalt based alloys such as CoCr and HA188. Nickel based alloys may also be used. It will be appreciated that the alloy used as the build material may correspond to the material of which the damaged component was manufactured. In general, the powder build material 370 may be selected for enhanced strength, durability, and useful life, particularly at high temperatures, although as described below, the powder build material 370 may also be selected based on the intended function of the area being formed.

Once the replacement component has been pre-fabricated using the AM process, it is subjected to all necessary post-processing operations in step 105 of method 100. For example, the post processing operating may be the same operations as were applied to the original turbine engine component. Returning to FIG. 3, at the completion of step 220, the article, i.e., the replacement portion for the gas turbine engine component, is removed from the additive manufacturing system (e.g., from the DMLF system 300). In optional step 230, the replacement portion for the gas turbine engine component formed in step 220 may undergo finishing treatments. Finishing treatments may include, for example, aging, annealing, quenching, peening, polishing, hot isostatic pressing (HIP), or coatings. If necessary, the replacement portion for the gas turbine engine component may be machined to final specifications. As noted above, one example of a post-laser fusion process of step 230 is a HIP process in which an encapsulation layer is applied and pressure and heat are applied to remove or reduce any porosity and cracks internal to or on the surface of the component, as described in U.S. patent application Ser. No. 12/820,652, titled "METHODS FOR MANUFACTURING TURBINE COMPONENTS," and published as United States Patent Application Publication No. 2011/0311389. The encapsulation layer functions to effectively convert any surface porosity and cracks into internal porosity and cracks, and after the application of pressure and heat, removes or reduces the porosity and cracks. Such encapsulation layers may be subsequently removed or maintained to function as an oxidation protection layer.

In one exemplary embodiment, the encapsulation layer may be a metal or alloy that is compatible with the substrate and may be applied by a plating or coating process, as described below. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be smaller or larger to form a compacted solid having negligible porosity.

Thereafter, at step 106 of method 100, the pre-fabricated structure is joined to the existing (damaged) component via a diffusion bonding or a brazing process, for example, or any other suitable metal joining process. As is known in the art, diffusion bonding is a solid state welding process by which two metals (which may be dissimilar) can be bonded together. Diffusion involves the migration of atoms across the joint, due to concentration gradients. The two materials are pressed together at an elevated temperature usually between 50 and 70% of the melting point. The pressure is used to relieve the void that may occur due to the different surface topographies. As is further known in the art, brazing is a metal-joining process whereby a filler metal is heated above melting point and distributed between two or more close-fitting parts by capillary action. The filler metal is brought slightly above its melting (liquidus) temperature while protected by a suitable atmosphere, usually a flux. It then flows over the base metal (known as wetting) and is then cooled to join the workpieces together.

Finally, at step 107 of method 100, finishing operations and final inspections are performed before returning part into service. Finishing operations can include, for example, heat treatment to restore properties, machining to dimensions (via machining, blending, honing, or other similar process), shot peening, and application of diffusion or thermal barrier coatings. Inspections can include fluorescent penetrant, airflow, computed tomography (CT), and radiographic examination. This is performed after bonding is completed. Furthermore, as with the original inspection of the damaged component, the final inspection can include, for example, visual inspection and/or NDE methods. The present disclosure is not intended to be limiting to any particular method of final inspection.

Accordingly, the exemplary embodiments described herein provide improved methods for repairing components for use in gas turbine engines. The exemplary embodiments described herein further provide methods that allow gas turbine engine components, regardless of size or post-processing operations, to be repaired using additive manufacturing techniques.

It is noteworthy that, unless otherwise specified in a particular embodiment, the methods described herein are independent of the specific order in which the steps are described. For purposes of illustration, the methods are described as a specific sequence of steps; however, it is to be understood that any number of permutations of the specified sequence of steps is possible, so long as the objective of the component repair being described is accomplished. Stated another way, the steps recited in any of the disclosed methods may be performed in any feasible order, and the methods of the invention are not limited to any particular order presented in any of the described embodiments, the examples, or the appended claims.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A method for repairing a damaged metallic component using additive manufacturing techniques, the method comprising the steps of:
    separating a damaged portion of the damaged metallic component from an undamaged portion of the damaged metallic component;
    further separating areas of the metallic component in the undamaged portion that are adjacent to the damaged portion to form recesses in the undamaged portion of the metallic component adjacent to the damaged portion;
    measuring the undamaged portion to determine the dimensions of the removed damaged portion and the removed recesses from the undamaged portion;
    fabricating a replacement portion using additive manufacturing techniques in accordance with the determined dimensions of the removed damaged portion and the removed recesses from the undamaged portion, wherein the replacement portion includes a locking feature that comprises flanges that correspond in shape with the recesses, and further wherein the replacement portion is fabricated using a first material at a first end thereof and a second material at a second end thereof that is opposite the first end, wherein the first end comprises the locking feature and the first material comprises a joining material that differs from a material of the metallic component, and wherein the second end comprises the material of the metallic component; and
    joining the replacement portion with the undamaged portion of the damaged metallic component to form a repaired metallic component, wherein the joining further comprises joining the flanges of the locking feature with the recesses in the undamaged portion.

2. The method of claim 1, further comprising evaluating the damaged metallic component prior to separating the damaged portion from the undamaged portion to determine an extent of damage to the metallic component.

3. The method of claim 2, wherein evaluating the damaged metallic component comprises visually inspecting the damaged metallic component or non-destructively evaluating the damaged metallic component.

4. The method of claim 1, further comprising subjecting the replacement portion to a post-processing operation.

5. The method of claim 4, wherein subjecting the replacement portion to the post-processing operation comprises subjecting the replacement portion to a process selected from the group consisting of: aging, annealing, quenching, peening, polishing, hot isostatic pressing (HIP), or coating.

6. The method of claim 1, further comprising performing a finishing operation on the repaired metallic component.

7. The method of claim 6, wherein performing the finishing operating on the repaired metallic component comprises one or more of aging, annealing, quenching, peening, polishing, hot isostatic pressing (HIP), or coatings.

8. The method of claim 1, further comprising performing a final inspection on the repaired metallic component.

9. The method of claim 8, wherein performing the final inspection on the repaired metallic component comprises visually inspecting the damaged metallic component or non-destructively evaluating the damaged metallic component.

10. The method of claim 1, wherein separating the damaged portion of the damaged metallic component comprises one or more of Electro-Discharge Machining (EDM), electro-chemical machining, milling, and laser cutting.

11. The method of claim 1, wherein measuring the undamaged portion comprises measuring the undamaged portion using a coordinate measuring machine (CMM) or white light measuring.

12. The method of claim 1, wherein fabricating the replacement portion using additive manufacturing techniques comprises fabricating the replacement portion using DMLS, EBM, or SLS.

13. The method of claim 1, wherein joining the replacement portion with the undamaged portion of the damaged metallic component comprises diffusion bonding or brazing the replacement portion with the undamaged portion, and wherein the joining material of the first end of the replacement portion comprises a braze metal or a weld metal.

14. The method of claim 1, wherein the damaged metallic component comprises a gas turbine engine component.

15. The method of claim 1, wherein the damaged gas turbine engine component is a component selected from the group consisting of: a turbine nozzle, a turbine vane segment, a heat exchanger, and a fuel control manifold.

16. A method for repairing a damaged gas turbine engine component using additive manufacturing techniques, the method comprising the steps of:
    evaluating a damaged gas turbine engine component to determine an extent of damage to the gas turbine engine component;
    separating a damaged portion of the gas turbine engine component from an undamaged portion of the damaged gas turbine engine component;
    further separating areas of the metallic component in the undamaged portion that are adjacent to the damaged portion to form recesses in the undamaged portion of the metallic component adjacent to the damaged portion;
    measuring the undamaged portion to determine the dimensions of the removed damaged portion and the removed recesses from the undamaged portion;
    fabricating a replacement portion using additive manufacturing techniques in accordance with the determined dimensions of the removed damaged portion and the removed recesses from the undamaged portion, wherein the replacement portion includes a locking feature that comprises flanges that correspond in shape with the recesses, and further wherein the replacement portion is fabricated using a first material at a first end thereof and a second material at a second end thereof that is opposite the first end, wherein the first end comprises the locking feature and the first material comprises a joining material that differs from a material of the metallic component, and wherein the second end comprises the material of the metallic component;

subjecting the replacement portion to a post-processing operation; and joining the replacement portion with the undamaged portion of the damaged gas turbine engine component to form a repaired gas turbine engine component, wherein the joining further comprises joining the flanges of the locking feature with the recesses in the undamaged portion.

17. The method of claim 16, wherein joining the replacement portion with the undamaged portion of the damaged gas turbine engine component comprises diffusion bonding or brazing the replacement portion with the undamaged portion, and wherein the joining material of the first end of the replacement portion comprises a braze metal or a weld metal.

18. The method of claim 16, wherein the damaged gas turbine engine component is a component selected from the group consisting of: a turbine nozzle, a turbine vane segment, a heat exchanger, and a fuel control manifold.

19. The method of claim 16, wherein fabricating the replacement portion using additive manufacturing techniques comprises fabricating the replacement portion using DMLS, EBM, or SLS.

20. A method for repairing a damaged metallic component using additive manufacturing techniques, the method comprising the steps of:

separating a damaged portion of the damaged metallic component from an undamaged portion of the damaged metallic component;

further separating areas of the metallic component in the undamaged portion that are adjacent to the damaged portion to form recesses in the undamaged portion of the metallic component adjacent to the damaged portion;

measuring the undamaged portion to determine the dimensions of the removed damaged portion and the removed recesses from the undamaged portion;

fabricating a replacement portion using additive manufacturing techniques in accordance with the determined dimensions of the removed damaged portion and the removed recesses from the undamaged portion, wherein the replacement portion includes a locking feature that comprises flanges that correspond in shape with the recesses, and further wherein the replacement portion is fabricated using a first material at a first end thereof and a second material at a second end thereof that is opposite the first end, wherein the first material differs from the second material; and joining the replacement portion with the undamaged portion of the damaged metallic component to form a repaired metallic component, wherein the joining further comprises joining the flanges of the locking feature with the recesses in the undamaged portion.

\* \* \* \* \*